United States Patent Office 2,962,467
Patented Nov. 29, 1960

2,962,467

CEMENT COMPOSITIONS

Herman B. Wagner, Blooming Glen, Pa., assignor to Tile Council of America, Inc., New York, N.Y., a corporation of New York No Drawing. Filed May 5, 1959, Ser. No. 810,986

5 Claims. (Cl. 260—37)

The present invention relates to cement compositions. More particularly the present invention relates to improved cement compositions which may be used with porous ceramic tile which has been installed dry.

The present application is a continuation-in-part of the inventor's application Serial No. 566,766, filed February 21, 1956, now abandoned, for Pointing Compounds.

At the present time a large amount of ceramic wall tile is installed through the use of adhesive and the joints are filled with conventional Portland cement which requires the tile to be soaked prior to pointing and which also requires the maintenance of a certain minimum humidity for proper curing. These soaking and humidity maintenance steps require special attention, add to the labor and equipment costs, and are consequently often skipped or neglected with the result that the installation lacks hard, firm joints. While attempts have been made to fill the joints between the porous edges of ceramic tile without wetting and humidity maintenance, presently available compositions produce soft, chalky joints which crack and flake to such an extent as to render them generally unsatisfactory.

According to the present invention it has been found that these disadvantages may be overcome through the use of compositions comprising Portland cement, and alkali metal sulfides or alkaline earth sulfides. Certain other additives may be included in these mortar compositions such as hardeners, pigment, accelerators and the like. These compositions have the property of resisting water loss to the porous tile and to the atmosphere, thus providing internal conditions necessary for proper curing. Segregation of the various materials in the composition is also prevented and a consistency is maintained which allows placement in joints without dropping or running from the ceiling or vertical wall tile joints.

It is accordingly a primary object of the present invention to provide improved cement compositions utilizing Portland cement, alkali metal sulfide and alkaline earth sulfide.

Another object of the invention is to provide improved cement compositions which may be used to fill the joint between the porous edges of ceramic tile which has been installed dry and which is not wet with water prior to pointing.

Another object of the invention is to provide improved cement compositions of the foregoing type which have the property of curing in a dry atmosphere.

It has been found that a mixture of Portland cement and alkali metal and alkaline earth metal sulfides has the property of properly curing when used for setting or pointing ceramic tile whether the installation is made under dry or wet conditions. Portland cement makes up the major proportion of the composition of the present invention and has added to it alkali metal sulfide or alkaline earth sulfide in a minor proportion as well as conventional additives when desired. To this dry mixture about 30% water is added to provide a pointing compound which when applied between the edges of dry tiles is readily worked between them and sets as a hard, adhesive, as contrasted to a soft, or crumbly, joint.

The results obtained using the composition described above are further improved by the addition of a Bunte salt to the composition. Bunte salts are water soluble organic thiosulfate compounds which are readily prepared by reacting organic monohalides and polyhalides with water soluble organic thiosulfates. This may be accomplished by refluxing at 95 to 120° C. the organic halide, such as an alkane chloride or an alkene chloride with an aqueous solution of an inorganic thiosulfate. Typical of such reactions would be those between sodium thiosulfate and bis-beta chloroethyl ether or between sodium thiosulfate and ethylene dichloride.

The explanation of this unexpected quality of properly curing under dry or wet conditions is thought to be as follows, although the invention is not intended to be limited to this explanation. Upon addition of water to a mixture of Portland cement, a Bunte salt and an alkali metal sulfide or alkaline earth sulfide, a reaction between the Bunte salt and the sulfide salt commences and polymerization occurs. The polymer thus produced remains finely dispersed in the liquid water phase and in this condition serves the dual function of preventing or retarding the rate at which water is absorbed into the porous ceramic tile edges, and retarding the rate of water evaporation into the atmosphere by forming a polymer film at the material-air interface. This reaction retains the water required for the cement hydration reaction and thus permits a proper cure for the cement.

A polymer or a like reaction product formed between the Bunte salt and the alkali metal sulfide or alkaline earth sulfide may be prepared beforehand for direct addition to the mortar composition rather than by forming this product in situ in the cement composition. The results thus obtained are equivalent to those obtained by the formation of the cement composition by the addition of the several ingredients individually.

The preferred sulfides added to the Portland cement and Bunte salt of the present invention are the alkaline earth polysulfides. The alkali metal polysulfides result in a product which is itself highly desirable but these salts form greater amounts of water soluble by-products than do the alkaline earth polysulfides. The alkali metal and alkaline earth monosulfides are less preferred, principally because, although their mechanical properties of bonding are substantially equivalent to those of the polysulfides, they have a tendency to discolor after a time in actual service.

It has been found that a composition of the foregoing type containing a mixture of Bunte salt and sulfide salt in as low a proportion as 2% of the weight of the cement yields a composition that is definitely superior to ordinary Portland cement under dry curing conditions. I have also found that when a pointing compound of the foregoing type is formed utilizing a mixture of a Bunte salt and a sulfide salt in an amount of 15% or greater based on the weight of dry cement proper curing is not secured. Under such circumstances the additives generate excessive heat and enter into a reaction with the cement so as to appreciably interfere with the cement hydration reaction and produce a very weak, powdery joint. When the combined amount of Bunte salt and sulfide salt slightly in excess of 10% by weight of the cement is utilized, a fairly firm joint is ultimately obtained although objectionable stratification of the polymeric material is obtained at the grout-air interface.

It has thus been found that in order to obtain a jointing compound capable of providing a satisfactory joint under dry installation conditions, the foregoing additives should be utilized in a range of approximately 2 to 10% of the weight of the cement and that optimum curing properties are obtained when an amount between 3 and 7% of the weight of the cement is used. The sulfide salt should be present in an amount equaling approximately 0.4 to 3.0% of the weight of the cement and the Bunte salt should be present in an amount equal to approximately 1 to 7% of the weight of the cement. Although it has been found that an improved pointing compound is obtained when the sulfide salt alone is mixed with the cement in an amount equal to approximately 0.4 to 3.0% of the weight of the cement no such improvement is obtained when Bunte salt is used in the absence of the sulfide salt. While this compound is not as advantageous as those containing both the sulfide salt and the Bunte salt it is nevertheless an improvement over conventionally used pointing compounds.

When the aforementioned additives are utilized in the formation of a jointing compound, the cure of the cement is somewhat retarded and if this retardation is relatively great, as with the higher percentage additions of the foregoing materials, difficulty is sometimes experienced in cleaning the tile face subsequent to application of the pointing compound to the tile joint. Under ideal conditions the joint is in a fairly firm condition during the cleaning operation in order to resist any disturbance incident thereto. If, however, curing of the pointing compound is overly retarded this firm condition is not obtained and proper cleaning becomes quite difficult. In order to eliminate this trouble I have found that calcium chloride may be added to the composition in amounts up to approximately 2% of the weight of the cement in order to hasten the setting time by accelerating cement hydration. The amount of calcium chloride employed which may be as great as 2% progressively increases the rate of cure so that when calcium chloride is used in conjunction with the Bunte salt and alkali metal sulfides or alkaline earth sulfides it is possible to adjust the rate of cure over a much broader range than is possible with ordinary Portland cement. Any tendency to crack where relatively large amounts of water are used with the mixture of this invention may be overcome by the addition of small amounts of finely divided aluminum powder.

Following are examples of illustrative jointing compounds prepared according to this invention:

*Example I*

96 gms. Atlas white Portland cement
2 gms. calcium polysulfide
2 gms. CaCl$_2$

This mixture, combined with 30% of its weight of water, gave a composition with improved hardness, when set between dry tile, over that obtained when the calcium polysulfide was omitted. The hardness, whiteness, flexibility, and application properties were not as favorable, however, as with the combination of Bunte salt and calcium polysulfide noted in Examples III and IV.

*Example II*

94% white Portland cement
6% barium polysulfide

When 30% of its weight of water was added to this composition a very hard joint was obtained between dry tile. It is to be noted that no calcium chloride was required to obtain this hardness.

*Example III*

94.5% white Portland cement
2.7% Bunte salt ether type (formed by reacting bis-beta chloroethyl ether and sodium thiosulfate)
1.3% calcium polysulfide
1.5% calcium chloride
0.02% powdered aluminum metal This mixture, when mixed with 35% of its weight of water gave a creamy dispersion, showed excellent application properties, and settled between dry tile to form a hard adherent jointing substance.

*Example IV*

92.2% white Portland cement
2.7% Bunte salt, ether type
1.3% calcium polysulfide
0.8% calcium chloride
3.0% titanium dioxide pigment
0.02% powdered aluminum metal This mixture, when mixed with 35% of its weight of water showed excellent application properties, exhibited a longer working time than the composition of Example III, and also yielded a hard adherent pointing material, somewhat whiter than that obtained in Example III.

*Example V*

92.0% white Portland cement
2.4% Bunte salt, ethylene type (formed by reacting ethylene dichloride and sodium thiosulfate)
1.3% calcium polysulfide
0.8% calcium chloride
3.5% titanium dioxide
0.02% powdered aluminum metal This mixture, when mixed with 35% of its weight of water, gave a creamy dispersion with properties similar to those obtained with the compositions set out in Examples III and IV hereinabove.

*Example VI*

94 gms. Portland cement
2.6% Bunte salt, ether type
1.4% barium polysulfide
2.0% calcium chloride This mixture, when mixed with 30% of its weight of water gave results similar to those obtained with the compositions of Examples III and IV.

*Example VII*

94 gms. Portland cement
2.6% Bunte salt, ether type
1.4% strontium polysulfide
2.0% calcium chloride This mixture, when mixed with 30% of its weight of water gave results similar to those obtained with the compositions of Examples III and IV.

*Example VIII*

92% white Portland cement
5% barium polysulfide
3% Bunte salt

When 30% of its weight of water was added to this composition a very hard joint was obtained between dry tile. This material was substantially whiter than that of Example II and yielded a fuller joint and stronger bond to the tile edge.

*Example IX*

50 weight parts of ethylene oxide type Bunte salt (prepared by reaction of bis-beta chloroethyl ether with sodium thiosulfate) were added to 200 weight parts of water. 21.5 parts of calcium polysulfide were added to 50 parts of water. These slurries were then mixed, with slow agitation for about one hour, to allow reaction to form the polymer. The solid polymer particles were then settled by centrifuging and then washed several times with free water, a centrifuging following each washing.

A portion of the wet-polymer was then frozen in a thin-layer by immersing the containing vessel in a Dry-Ice, ethyl alcohol bath and the vessel then evacuated.

(a) 10 weight parts of the powder thus obtained were mixed with 90 weight parts of Portland cement, and to this were added 32 parts of water. This composition hardened to give a flexible, adherent grout joint.

While the cement compositions of this invention are valuable primarily because of their ability to form satisfactory joints between ceramic tiles which have been installed dry and which are not wet with water prior to pointing, it may also be advantageously utilized under wet conditions. In addition the compositions are quite superior in other applications such as a mortar for brick work, mortar setting beds to which tile can be affixed even when dry, paints, and bonding compositions for use with terrazzo, cinder block, and the like.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A dry cement composition designed to be combined with water consisting essentially of Portland cement and based on the weight of said cement 0.3 to 4.0% of a water soluble metal sulfide selected from the group consisting of alkali metal sulfides and alkaline earth metal sulfides and 1 to 7% of a Bunte salt.

2. A dry cement composition as set forth in claim 1 wherein the Bunte salt is formed by the reaction of inorganic thiosulfates with ethylene halides.

3. A dry cement composition as set forth in claim 1 wherein the Bunte salt is formed by the reaction of inorganic thiosulfates with organic halide ethers.

4. A dry cement composition as set forth in claim 1 wherein the alkaline earth polysulfide is selected from the group consisting of calcium polysulfide, barium polysulfide and strontium polysulfide.

5. A dry cement composition designed to be mixed with water consisting essentially of Portland cement and based on the weight of said cement 2–10% of the product resulting from reacting from 1 to 7 parts by weight of Bunte salt with from 0.3 to 4.0 parts by weight alkaline earth polysulfide.

References Cited in the file of this patent

UNITED STATES PATENTS 1,791,684    Reubke _____ Feb. 10, 1931